3,152,925
HIGH VISCOSITY STARCH DERIVATIVES
Chim Patel, St. Louis, Mo., and Ronald E. Pyle, Granite City, Ill., assignors to Union Starch & Refining Co., Inc., Columbus, Ind., a corporation of Indiana
No Drawing. Filed Aug. 18, 1961, Ser. No. 132,307
6 Claims. (Cl. 127—33)

The present invention relates generally to starch derivatives and more particularly to a novel high viscosity, water soluble starch product and to a novel method for producing it from unmodified starch. Specifically, the present invention pertains to a thick-boiling starch ether prepared from unmodified starch with dichlorobutene as the principal reactant.

An object of the present invention is to produce a modified starch product which gives higher paste viscosity than unmodified starch when cooked either with water or alkaline solution.

A second object of this invention is to produce a modified starch product which gelatinizes at a lower temperature than common for the unmodified starch from which it is made.

Another object is to prepare a modified starch product which yields a softer cold paste than that of the unmodified starch.

A further object of this invention is to produce a modified starch product having the above listed properties by a method which does not disrupt the starch granules through gelatinization.

In the process of this invention, starch slurries are treated under conditions especially suited to equipment common to the industry. Accordingy to the present invention, treatment of starch with dichlorobutene produces a modified starch product which yields higher paste viscosities than obtained from the unmodified starch.

Briefly, the objects of the present invention are attained by reacting a relatively small amount of dichlorobutene with unmodified starch, such as obtained from corn, for example, under controlled conditions of pH, time, temperature, Baumé of starch slurry and concentration of dichlorobutene to produce a water soluble thick-boiling starch.

In following the teachings of the present invention, a starch slurry, i.e., unmodified corn starch granules and water at a temperature of about 68°–130° F. and with a Baumé of 14 to 21 is acidified or made alkaline to adjust the pH thereof preferably between 4 to 10. The starting pH of the slurry is usually in the neighborhood of about 3–5 and will depend upon the source of the corn, the time of the year of its harvest and conditions in the plant which produces the starch slurry. Any base or acid may be used which will adjust the pH to a suitable level such as sodium carbonate ($Na_2CO_3$), hydrogen chloride (HCl) or the like. It should be borne in mind that the base or acid is not used to "modify" the starch but to adjust the pH of the slurry prior to the addition of the reactant.

The amount of dichlorobutene required for modification may vary from 0.05% to about 10.0%, based on dry substance starch. With 0.05% of dichlorobutene, a significant increase of hot paste viscosity in water and the maximum alkaline viscosity are noted. As more dichlorobutene is reacted with the starch, the viscosity of the modified starch increases. Dichlorobutene, however, forms insoluble starch when it is reacted in the concentration of more than 10.0% with unmodified starch. The reaction can be conducted at a pH level above about 4 and up to about pH 10. The preferred pH range is 4–6.

The reaction proceeds satisfactorily at temperatures about 68° F. to about 130° F. and is not extremely sensitive to temperature variation. Below about 80° F. however, the reaction is slow and the preferred temperature is from 80° F. to 130° F. Above 130° F. there is danger of gelatinization during the reaction if at a high pH and danger of degradation at a low pH. Starch slurries at about 115° F. as delivered to the drying equipment in starch plants work very satisfactorily in the process.

The reaction time is not critical. Starch slurries reacted from 1 to 24 hours or more before being sent to the driers have been found to be satisfactory. Occasionally, it is not possible to dry a reacted starch immediately and the delay of 10 hours or more have not caused any change in the viscosity of the modified starch.

The starch may be treated in the form of a slurry as it comes from the final stage of the wet milling process. The slurry may have almost any desity. When slurries of 14 to 21 Baumé have been treated under otherwise similar conditions, the resultant viscosities and other properties of the products are substantially the same.

After treating with the dichlorobutene, the slurries are filtered and the starch is dried at about 240° F., for example, to about 10% moisture.

The measurement of the viscosity of hot starch pastes is used in the industry to determine the degree of modification of starch products. Hot paste viscosity is commonly determined by the Scott method and the Corn Industries Viscometer method. Procedures for these methods of analysis are described by R. W. Kerr in his book entitled "Chemistry and Industry of Starch."

In addition to these tests, the maximum alkaline viscosity (M.A.V.) was determined. In this test, 170 grams of starch (as is basis) is mixed with 900 ml. of water at 120° F. and 100 ml. of 32% sodium hydroxide solution. This mixture is placed in a steam-jacketed vessel equipped with a mechanical agitator. Agitation is started and the temperature of the mixture is raised to 165° F. After holding at this temperature for 10 minutes, 900 ml. of tap water at 80° F. is added to the cooked starch paste. The mixture is cooled to 100° F. and the viscosity is measured by means of a Brookfield viscometer.

The following examples further illustrate the process of the invention.

The processes, as described below, are applied to corn starch. However, these processes are also suitable for modifying other starches, such as potato, tapioca, rice, grain, sorghum and wheat starches.

EXAMPLE 1

A corn starch slurry sample of 17° Bé. corrected to 60° F. was separated into two equal parts. The first part was used as a control. To the second part, 0.05%, dry substance basis (D.S.B.), of dichlorobutene was added. The pH was adjusted to 10.0 and the slurry was held at 80–90° F. for 3 hours. Thereafter, the slurry was neutralized to pH 5.0, filtered and the starch was dried at 240° F. to a 10% moisture content. The control was subjected to the same treatment but without the dichlorobutene addition. The properties of the modified and control starch are set forth in Table I below.

*Table I*

| Example | Conc. of Dichlorobutene, percent | Gel Temp., °C. | Max. Visc., gm./cm. | Visc. 30', gm./cm. | A.P.V., gm./cm. | M.A.V., cps. | Alkali Number |
|---|---|---|---|---|---|---|---|
| Control | 0 | 87 | 130 | 120 | 1,480 | 1,100 | 7.86 |
| 1 | 0.05 | 86 | 183 | 168 | 1,220 | 1,700 | 7.41 |

Maximum viscosity, viscosity at 30 minutes and aged paste viscosity (A.P.V.) were measured in (grams/centimeters) with the Corn Industries Research Foundation Viscometer. Maximum alkaline viscosity (M.A.V.) was measured in centipoises with Brookfield Viscometer. Alkali number was determined according to the procedure given by Schoch and Jensen in Ind. Eng. Chem., Anal. Ed., 12, 531 (1940).

Thus, as indicated in Table I, the treatment of starch with 0.05% dichlorobutene measurably influenced the viscosity characteristics of the starch when pasted with water and also with alkaline solution.

EXAMPLES 2–9

The process set forth in Example 1 was repeated with 0.1–10% concentrations of dichlorobutene to determine the influence of the concentration of this reactant on the properties of the final product. The properties of the modified starch products (Examples 2–9) and of the unmodified controls for these samples are presented in Table II.

*Table II*

| Examples | Conc. of Dichlorobutene, percent | Gel Temp., °C. | Max. Visc., gm./cm. | Visc. 30', gm./cm. | A.P.V., gm./cm. | M.A.V., cps. | Alkali Number | Scott Viscosity |
|---|---|---|---|---|---|---|---|---|
| Controls (2–9) | 0 | 87 | 130 | 120 | 1,480 | 1,100 | 7.86 | 90 |
| 2 | 0.1 | 84 | 225 | 200 | 1,000 | 2,700 | 6.63 | 200+ |
| 3 | 0.2 | 82 | 200 | 200 | 1,000 | 5,400 | 5.24 | |
| 4 | 0.3 | 84 | 200 | 185 | 960 | | 5.11 | |
| 5 | 0.5 | 83 | 260 | 245 | 1,000 | 5,500 | 4.82 | |
| 6 | 1.0 | 84 | 280 | 250 | 840 | 7,800+ | 4.80 | |
| 7 | 2.0 | 87 | 210 | 190 | | 10,000+ | 4.52 | |
| 8 | 5.0 | 89 | 80 | 80 | | | 4.50 | |
| 9 | 10.0 | 0 | 0 | 0 | | | | |

It will be seen from the above table that the following modifications in viscosity properties have occurred:

(1) Gelatinization temperature was lowered 1–5° C. below that of the control samples. The gelatinization temperature reached a minimum in samples treated with 0.1–0.5% dichlorobutene.

(2) In all cases, the maximum viscosity of the hot pastes was increased, reaching a maximum at the 1.0% dichlorobutene treatment level. An insoluble starch is formed when unmodified starch is reacted with 10.0% or more of dichlorobutene.

(3) Set back on cooling as measured by the aged paste viscosity (A.P.V.) was significantly lowered. Maximum lowering of this property was reached at 0.1–1.0% dichlorobutene treatment level.

(4) The maximum alkali viscosity was much higher than the controls at all levels of treatment.

(5) The alkali number of the dichlorobutene treated starches was lower than that of the controls.

Starches with these higher viscosities are especially useful for adhesives, corrugating, charcoal, coal and ores briquetting, textile finishing such as back sizing, filling certain kinds of fabrics, wet end addition in paper manufacturing, and acoustical tile manufacturing.

EXAMPLES 10–16

The influence of pH on the process set forth in Example 1 was determined by treating 17° Bé. starch slurries with 0.2% D.S.B. dichlorobutene at 80–90° F. for 3 hours at pH levels of 4–10. The results are set forth in Table III and show that reaction pH has little influence on the nature of the product obtained.

*Table III*

| Example | Conc. of Dichlorobutene, percent | pH | Gel Temp., °C. | Maximum Viscosity, gm./cm. | Viscosity at 30 min., gm./cm. |
|---|---|---|---|---|---|
| Control (10–16) | 0 | | 87 | 130 | 120 |
| 11 | 0.2 | 4.0 | 84 | 200 | 180 |
| 12 | 0.2 | 5.0 | 83 | 215 | 190 |
| 13 | 0.2 | 6.0 | 83 | 210 | 190 |
| 14 | 0.2 | 7.0 | 82 | 195 | 170 |
| 15 | 0.2 | 8.0 | 83 | 230 | 200 |
| 16 | 0.2 | 9.0 | 83 | 210 | 185 |
| | | 10.0 | 82 | 200 | 185 |

The pH of 4–6 is preferred because the starch slurry as it comes from the wet milling process is at about this pH and because, as can be seen from Table III, the control over the viscosity of the resultant starch is better when the pH is in this range.

EXAMPLES 17–21

Examples 17–21 were conducted substantially as Example 1 on a 17° Bé. starch slurry, with 0.2% D.S.B. dichlorobutene at a pH of 10.0 and at various temperatures indicated in Table IV.

*Table IV*

| Example | Temp., °F. | Gel. Temp., °C. | Maximum Viscosity, gm./cm. | Viscosity at 30 min., gm./cm. |
|---|---|---|---|---|
| Control (17–21) | | 87 | 130 | 130 |
| 17 | 80 | 82 | 200 | 185 |
| 18 | 100 | 84 | 240 | 225 |
| 19 | 110 | 83 | 250 | 230 |
| 20 | 120 | 83 | 240 | 220 |
| 21 | 130 | 83 | 230 | 210 |

The process has also been conducted at various reaction times but no significant differences in results have been noted between about 1 to over 24 hours of reaction time. Similarly, changing the Baumé of the slurry has been found to have no significant effect on the results.

The features and principles underlying the invention described above in connection with specific exemplifications will suggest to those skilled in the art many other modifications thereof. It is accordingly desired that the appended claims shall not be limited to any specific feature or details thereof.

We claim:

1. The process for producing a starch reaction product of relatively high viscosity compared to that of unmodified starch comprising reacting unmodified starch with about 0.05 to 10% by weight (dry substance basis) of dichlorobutene.

2. The process as claimed in claim 1 wherein the starch to be treated is provided in the form of an aqueous slurry.

3. The process as claimed in claim 1 wherein the starch to be treated is in the form of an aqueous slurry and the reaction is carried out at a temperature of about 68°–130° F.

4. The process as claimed in claim 1 wherein the starch to be treated is in the form of an aqueous slurry and comprising maintaining the pH of the slurry at 4–10 during the reaction.

5. The process as claimed in claim 1 wherein the starch to be treated is in the form of an aqueous slurry and comprising maintaining the pH of the slurry at 4–6 during the reaction.

6. The process as claimed in claim 1 in which the dichlorobutene is 1,4-dichlorobutene-2.

References Cited in the file of this patent
UNITED STATES PATENTS 3,004,855    Smith et al. _____ Oct. 17, 1961